(12) United States Patent
Yamazoe et al.

(10) Patent No.: US 10,114,218 B2
(45) Date of Patent: Oct. 30, 2018

(54) HEAD UP DISPLAY DEVICE

(71) Applicant: NIPPON SEIKI CO., LTD., Niigata (JP)

(72) Inventors: Takashi Yamazoe, Niigata (JP); Takuro Hirokawa, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 15/526,078

(22) PCT Filed: Nov. 11, 2015

(86) PCT No.: PCT/JP2015/081683
§ 371 (c)(1),
(2) Date: May 11, 2017

(87) PCT Pub. No.: WO2016/076342
PCT Pub. Date: May 19, 2016

(65) Prior Publication Data
US 2017/0315351 A1    Nov. 2, 2017

(30) Foreign Application Priority Data

Nov. 12, 2014  (JP) ................................. 2014-229919
Oct. 28, 2015  (JP) ................................. 2015-212180

(51) Int. Cl.
*G02B 27/01*  (2006.01)
*G02B 1/11*  (2015.01)
(Continued)

(52) U.S. Cl.
CPC .......... *G02B 27/0101* (2013.01); *B60K 35/00* (2013.01); *G02B 1/11* (2013.01);
(Continued)

(58) Field of Classification Search
CPC ........ G02B 27/0101; G02B 1/14; G02B 1/11; G02B 1/10; G02B 1/30; G02B 27/01;
(Continued)

(56) References Cited

U.S. PATENT DOCUMENTS 4,749,397 A * 6/1988 Chesworth ........ B32B 17/10174
65/104
2013/0265646 A1* 10/2013 Sakai ..................... G02B 27/01
359/631

FOREIGN PATENT DOCUMENTS

JP    S62-275845 A    11/1987
JP    H09-159986 A    6/1997
(Continued)

OTHER PUBLICATIONS

Search Report issued in corresponding International Patent Application No. PCT/JP2015/081683, dated Jan. 26, 2016.

*Primary Examiner* — Jie Lei
*Assistant Examiner* — Mitchell Oestreich
(74) *Attorney, Agent, or Firm* — McDermott Will & Emery LLP

(57) ABSTRACT

The problem addressed by the present invention is to provide a head up display device capable of counteracting sunlight without using a shutter or a reflection type polarizing film. A first concave mirror has a curvature to cause the reflected display light to intersect vertically before reaching a second mirror, and a second concave mirror serves to reflect the received display light. A case is provided with a first shield and a second shield extending near an intersecting point to sandwich a light path between the first and second concave mirrors. The first and second shields can block external light entering into the case from outside the case and proceeding toward the first concave mirror after being reflected from the second concave mirror.

11 Claims, 10 Drawing Sheets

(51) Int. Cl.
*G02B 1/14* (2015.01)
*G02B 5/10* (2006.01)
*G02B 5/30* (2006.01)
*B60K 35/00* (2006.01)

(52) U.S. Cl.
CPC .............. *G02B 1/14* (2015.01); *G02B 5/10* (2013.01); *G02B 5/30* (2013.01); *G02B 27/01* (2013.01); *G02B 27/0149* (2013.01); *B60K 2350/1072* (2013.01); *B60K 2350/2052* (2013.01); *B60K 2350/2078* (2013.01); *B60K 2350/941* (2013.01); *G02B 2027/0118* (2013.01); *G02B 2027/0152* (2013.01)

(58) Field of Classification Search
CPC ........ G02B 27/0149; G02B 5/10; G02B 5/30; G02B 2027/0118; G02B 2027/0152; B60K 35/00; B60K 2350/1072; B60K 2350/2052; B60K 2350/2078; B60K 2350/941
USPC .................. 359/630, 631, 633, 603
See application file for complete search history.

(56) References Cited

FOREIGN PATENT DOCUMENTS

| | | | |
|---|---|---|---|
| JP | 2003-237411 | A | 8/2003 |
| JP | 2004-226469 | A | 8/2004 |
| JP | 4114194 | B2 | 7/2008 |

\* cited by examiner (a)

(b)

(a)

(b)

HEAD UP DISPLAY DEVICE

CROSS REFERENCE

This application is the U.S. National Phase under 35 U.S.C. § 371 of International Application No. PCT/JP2015/081683, filed on Nov. 11, 2015, which claims the benefit of Japanese Application No. 2015-212180, filed on Oct. 28, 2015 and Japanese Application No. 2014-229919, filed on Nov. 12, 2014, the entire contents of each are hereby incorporated by reference.

TECHNICAL FIELD

The present invention relates to a head up display device with sunlight countermeasure.

BACKGROUND ART

A driver of a vehicle gazes at the front through a windshield, and performs driving while visually observing instruments on an instrument panel. That is, a line of sight moves to the front and lower instruments. If a driver can see instruments while looking at the front, there is no movement of the line of sight, and improvement of drivability can be expected. From this finding, a head up display device has been developed and put to practical use. As a conventional technique related to a head up display device, there is a technique disclosed in Patent Literature 1.

As shown in FIG. 1 of Patent Literature 1, the image light beam emitted upward from the HUD display (2) (the numerals in parentheses indicate the reference number described in Patent Literature 1, the same applies hereinafter) strikes the inner surface of the windshield (5) and is reflected and imaged in front of the driver (Patent Literature 1, paragraph number [0012]). When not in use, the optical path is blocked with the shutter (4) so that external light (sunlight) does not reach the HUD display (2). This makes it possible to prevent damage to the HUD display (2) (Patent Literature 1, paragraph number [0006]).

Since the shutter (4) and the driving means for driving the shutter (4) are necessary, the head up display device becomes expensive and becomes large. In addition, when in use, that is, during operation, since the shutter (4) is open, incidental sunlight cannot be prevented at this time. A structure capable of preventing the incidence of sunlight at all times, including during operation, is required.

Therefore, the inventors of the present invention proposed a head up display device, which took measures against sunlight without using a shutter. As a conventional technique relating to a head up display device taking measures against sunlight, there is a technique disclosed in Patent Literature 2.

As shown in FIG. 1 of Patent Literature 2, a reflection type polarizing film (21) (numerals in parentheses indicate the symbols described in Patent Literature 2, the same applies hereinafter) are interposed in the optical path. Due to the presence of the reflection type polarizing film (21), the temperature of the liquid crystal shell (16) does not rise even when sunlight (b) enters (Patent Literature 2, paragraph number [0013]). The reflection type polarizing film (21) is attached to the upper surface of the glass substrate (22).

According to Patent Document 2, it is possible to take measures against sunlight all the time. However, since the reflection type polarizing film (21) and the glass substrate (22) are indispensable, there is concern that the head up display device will be expensive and become large.

While miniaturization and cost reduction of the head up display device are required, a device capable of taking measures against sunlight without using a shutter or a reflection type polarizing film is desired.

CITATION LIST

Patent Literature

Patent Literature 1: Japanese Unexamined Patent Application Publication No. 2003-237411
Patent Literature 2: Japanese Patent No. 4114194

SUMMARY OF THE INVENTION

Problems to be Solved by the Invention

It is an object of the present invention to provide a head up display device, which can take measures against sunlight without using a shutter or a reflection type polarizing film.

Solution to Problem

The inventors of the present invention tried the following improvement on the head up display device described in FIG. 1 of Patent Literature 2 previously proposed by the present inventors. An improved device 100 will be described with reference to FIG. 1.

The head up display device 100 shown in FIG. 1 is a primary improvement type device, and is different from the device described in Patent Literature 2 in that between the concave mirror 101 and the plane mirror 102, the shielding plate 104 and the shielding plate 105 were extended to the very vicinity of the optical path 103. The sunlight 106 is reflected by the concave mirror 101, hits the shielding plate 104, stops, and there is no fear of reaching the display unit 107.

Incidentally, in recent years, an increase in the size of the display image is required, and as a result, the opening 109 opened in the upper part of the case 108 becomes larger, the concave mirror 101 becomes larger, and the width of the optical path 103 increases. As the size of the displayed image increases, sunlight easily intrudes and countermeasures are required.

The present inventors further advanced the improvement, completed the secondary improved device, and succeeded in taking good sunlight countermeasures. That is, the head up display device 10 shown in FIG. 2 is a basic configuration diagram of the secondary improvement device.

As shown in FIG. 2, the head up display device 10 comprises a display unit 13 disposed above the light source 11 for emitting the display light 12, a first concave mirror 14 as a first mirror for reflecting the display light 12 emitted from the display unit 13, a second concave mirror 16 as a second mirror for reflecting the display light 15 reflected by the first concave mirror 14, a light source 11, a display unit 13, and a case 20 for housing the first and second concave mirrors 14, 16.

Furthermore, the first concave mirror 14 has a curvature (reciprocal of the radius) that causes the reflected display light 15 to cross up and down before reaching the second concave mirror 16, and the second concave mirror 16 reflects the received display light. That is, the first concave mirror 14 has a curvature such that the focal point of the first concave mirror 14 is located between the first concave mirror 14 and the second concave mirror 16. In other words, the distance from the first concave mirror 14 to the second concave mirror 16 is set to be longer than the focal length of the first concave mirror 14.

The case 20 includes a first shielding portion 23 and a second shielding portion 24 extending to the vicinity of the cross point 22 to sandwich the optical path 21 between the first and second concave mirrors 14, 16. The first and second shielding portions 23 and 24 can block external light 25 entering the case 20 from the outside of the case 20 and proceeding toward the first concave mirror 14 after being reflected by the second concave mirror 16.

The lower end (distal end portion) of the first shielding portion 23 is positioned on the cross point 22 side (lower side) than the line segment L1 connecting at least the upper end portion P1 of the reflection region of the display light 12 in the first concave mirror 14 and the upper end portion P2 of the reflection region of the display light 15 in the second concave mirror 16.

The upper end (distal end portion) of the second shielding portion 24 is positioned on the cross point 22 side (upper side) than the line segment L2 connecting at least the lower end portion P3 of the reflection region of the display light 12 in the first concave mirror 14 and the lower end portion P4 of the reflection region of the display light 15 in the second concave mirror 16.

In addition, the first and second shielding portions 23 and 24 extend so that the tips thereof approach each other. The shielding property of the external light 25 is higher as the tips thereof are closer to each other, which is desirable. That is, it is desirable that the tip ends of the two are close to the cross point 22 (focal point).

Generally, the end portion of the reflection region corresponds to the end portion of the concave mirror surface. If a masking tape or the like is provided on the mirror surface, the end portion of the exposed portion of the mirror surface can be regarded as the end portion of the reflection region.

Since the first and second shielding portions 23 and 24 serve to shield the external light, the temperature thereof rises higher than other portions of the case 20 (a portion distant from the shielding portions 23 and 24, for example, a bottom portion, hereinafter referred to as a general portion 26). Therefore, it is desired that the first and second shielding portions 23 and 24 have higher heat resistance than the general portion 26 of the case 20.

TABLE 1

|  | Case general portion | First/second shielding portions |
| --- | --- | --- |
| Combination example 1 | ABS resin (110° C.) | PC resin (150° C.) |
| Combination example 2 | PP resin (168° C.) | Epoxy resin (180° C.) |
| Combination example 3 | PC resin (150° C.) | Aluminum die-cast (580° C.) |

( ) Heat resistant temperature (reference value)

In general, there is a correlation between heat resistance temperature and melting temperature. That is, if the melting temperature is high, the heat resistant temperature tends to be high, and if the melting temperature is low, the heat resistant temperature tends to be low. In Table 1, melting temperature is described as a reference value of the heat resistant temperature. The heat resistant temperature is shown only for the epoxy resin that is a thermosetting resin.

In combination example 1 and combination example 2, resins were combined. In combination example 3, resin and light metal were combined.

In the combination example 3, the first and second shielding portions 23, 24 are aluminum die-cast products, but the aluminum die-cast product is integrated into the general portion 26 of the case 20 by insert molding, adhesion, screwing or equivalent bonding method.

Instead of increasing the heat resistance, the thermal conductivity may be increased. When the thermal conductivity is increased, heat transfer is promoted, and as a result, the temperatures of the first and second shielding portions 23 and 24 are lowered. The strength of the first and second shielding portions 23 and 24 against heat can be increased.

When the surfaces of the first and second shielding portions 23 and 24 are reflecting surfaces, reflected light is generated, the reflected light returns to the second concave mirror 16, is reflected, and is worried that it will go to the first concave mirror 14 without striking the first and second shielding portions 23 and 24.

As a countermeasure, anti-reflection treated films 27 and 27 for weakening or blocking the reflection of external light are formed at least in the portion where external light 25 strikes the first and second shielding portions 23 and 24. The anti-reflection treated film 27 is preferably a black paint, and black alumite is suitable if the base material is aluminum. Alternatively, the anti-reflection treatment may be a treatment of roughening by applying sandblast to a smooth surface.

According to the above findings, the invention according to claim 1 is characterized by comprising a display unit 13 for emitting display light 12, a first mirror 14 for reflecting the display light 12 emitted from the display unit 13, a second mirror 16 for reflecting display light 15 reflected by the first mirror 14, and a case 20 for housing the display unit 13 and the first and second mirrors 14, 16, wherein the first mirror 14 is a first concave mirror having a curvature that causes the reflected display light 15 to cross up and down before reaching the second mirror 16, the second mirror 16 is a second concave mirror that reflects the received display light, the case 20 includes a first shielding portion 23 and a second shielding portion 24 extending to the vicinity of the cross point 22 to sandwich the optical path 21 between the first and second concave mirrors, and wherein the first and second shielding portions 23 and 24 can shield external light 25 entering to inside the case 20 from the outside of the case 20 and proceeding toward the first concave mirror after being reflected by the second concave mirror.

In the invention according to claim 2, the first and second shielding portions 23, 24 are formed of a material having a thermal conductivity higher than that of the general portion 26 of the case 20.

In the invention according to claim 3, the first and second shielding portions 23 and 24 are formed of a material having a higher heat resistance temperature than that of the general portion 26 of the case 20.

In the invention according to claim 4, anti-reflection treatment for weakening or preventing reflection of the external light is applied to the first and second shielding portions 23 and 24 at least at a portion to which external light hits.

In the invention according to claim 5, the case 20 comprises a center frame supporting the first and second concave mirrors 14, 16 and including the second shielding portion 24, an upper cover attached to the upper side of the center frame and provided with a first shielding portion 23, and a lower cover attached to the lower side of the center frame.

In the invention according to claim 6, the center frame is a metal molded product, the lower cover is a resin molded product, and the upper cover is a resin molded product or a metal molded product.

In the invention according to claim 7, the metal molded product is an aluminum die-cast product.

In the invention according to claim 8, the case comprises a center frame supporting the first and second concave mirrors and including the second shielding portion, and an upper cover attached to the upper side of the center frame and including the first shielding portion, wherein: the upper cover is a resin molded product, a metal plate is disposed at least on the upper surface of the first shielding portion, the density of the resin used for the material of the resin molded product is smaller than the density of the metal plate, and the heat resistance temperature of the metal plate is higher than the heat resistance temperature of the resin.

EFFECT OF THE INVENTION

In the present invention according to claim 1, the first mirror is a first concave mirror having a curvature that causes the reflected display light to cross up and down before reaching the second mirror. At the crossing point, the width of the light path becomes small. The first shielding portion and the second shielding portion are extended to the vicinity of the crossing point such that external light such as sunlight is shielded by the first shielding portion and the second shielding portion. Most of the external light is shielded by the first and second shielding portions, and cannot reach the first concave mirror or the display. Therefore, according to the present invention, there is provided a head up display device capable of taking measures against sunlight without using a shutter or a reflection type polarizing film.

In the invention according to claim 2, the first and second shielding portions are formed of a material having a thermal conductivity higher than that of the general portion of the case. Since the thermal conductivity is high, heat transfer in the first and second shielding portions can be promoted, and the temperature of the first and second shielding portions can be lowered. That is, it is possible to suppress the heat from remaining in the first and second shielding portions, which tend to have a high temperature.

In the invention according to claim 3, the first and second shielding portions are formed of a material having a higher heat resistance temperature than that of the general portion of the case. By using a material having a high heat resistant temperature for the first and second shielding portions, which tend to have a high temperature, the strength against heat can be enhanced.

In the invention according to claim 4, the first and second shielding portions are subjected to antireflection treatment for weakening or preventing reflection of external light at least at a portion to which external light hits. There is no concern that external light hitting the first and second shielding portions returns to the second concave mirror.

In the invention according to claim 5, the case comprises a center frame supporting the first and second concave mirrors and having a second shielding portion; an upper cover attached to the upper side of the center frame and provided with a first shielding portion; and a lower cover attached to the lower side of the center frame. If the first concave mirror and the second concave mirror are attached to separate covers, it is necessary to adjust the optical axis in consideration of dimensional errors of the individual covers, which makes this adjustment troublesome. In the present invention, since the first concave mirror and the second concave mirror are attached to the common center frame, adjustment of the optical axes of the first concave mirror and the second concave mirror becomes easy.

In the invention according to claim 6, the center frame is a metal molded product, the lower cover is a resin molded product, and the upper cover is a resin molded product or a metal molded product. If it is a metal molded product, it is rich in rigidity. Since the first and second concave mirrors are attached to the center frame rich in rigidity, the optical axis is favorably maintained. Besides, metal molded products generally have higher heat resistance temperature and higher thermal conductivity than resin molded products.

In the invention according to claim 7, the metal molded product is an aluminum die-cast product. The metal molded product may be a metal pressed product, but pressed products cannot be complicated in shape. If it is a cast product, it can be made into a complicated shape, but thinning is difficult. In this respect, if it is a die-cast product, the structure becomes dense, it can be thinned, and it is suitable also for a complicated shape. Moreover, aluminum is lightweight, and the weight saving of the device can be achieved.

In the invention according to claim 8, a metal plate is disposed on the upper surface of the first shielding portion that is a resin molded product. The first shielding portion is a portion for shielding external light traveling into the case. That is, the upper surface of the first shielding portion is exposed to external light. As an example of external light striking the first shielding portion, sunlight can be mentioned. High heat resistance is required for the first shielding portion to which sunlight impinges. On the other hand, it is desirable that the head up display device as a whole be lightweight. The resin used for the upper cover has a smaller (lower) density than the metal plate. For this reason, by making the upper cover a resin molded product, it is possible to reduce the weight of the head up display device. On the other hand, the metal plate has higher heat resistance temperature (heat resistance) than the resin used for the upper cover. Therefore, by disposing a metal plate on the upper surface of the first shielding portion to which sunlight impinges, heat resistance can be enhanced. That is, it is possible to increase the heat resistance of the first shielding portion while reducing the weight of the head up display device.

MODE FOR CARRYING OUT THE INVENTION

Embodiments of the present invention will be described below with reference to the accompanying drawings.

EXAMPLE 1

Figure 1:
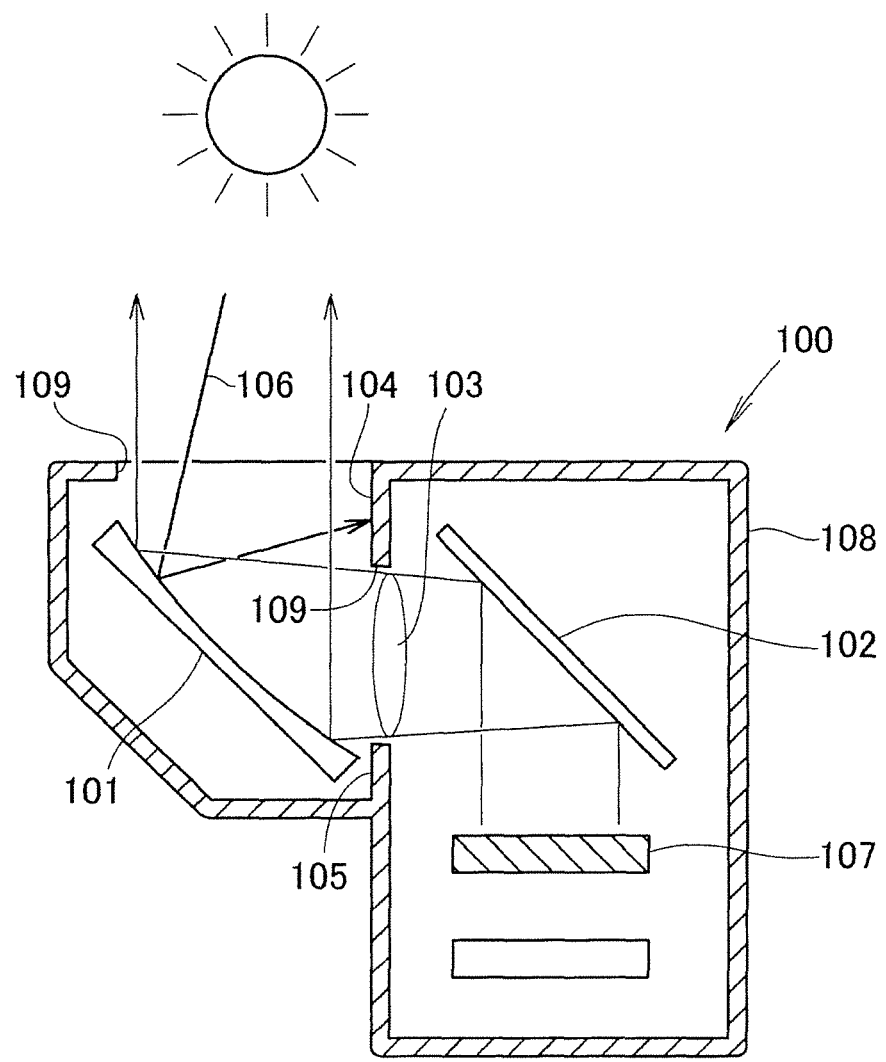
FIG. 1 is a principle diagram of a first modified device.
Figure 2:
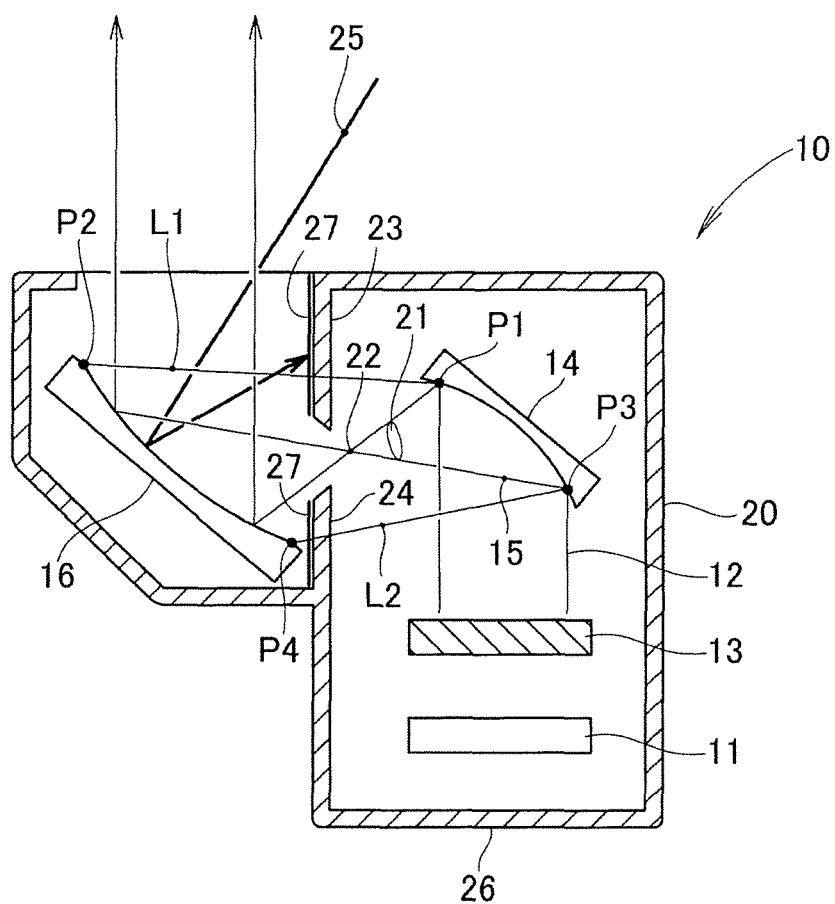
FIG. 2 is a basic configuration diagram of a second modified product, that is, a head up display device according to the present invention.
Figure 3:
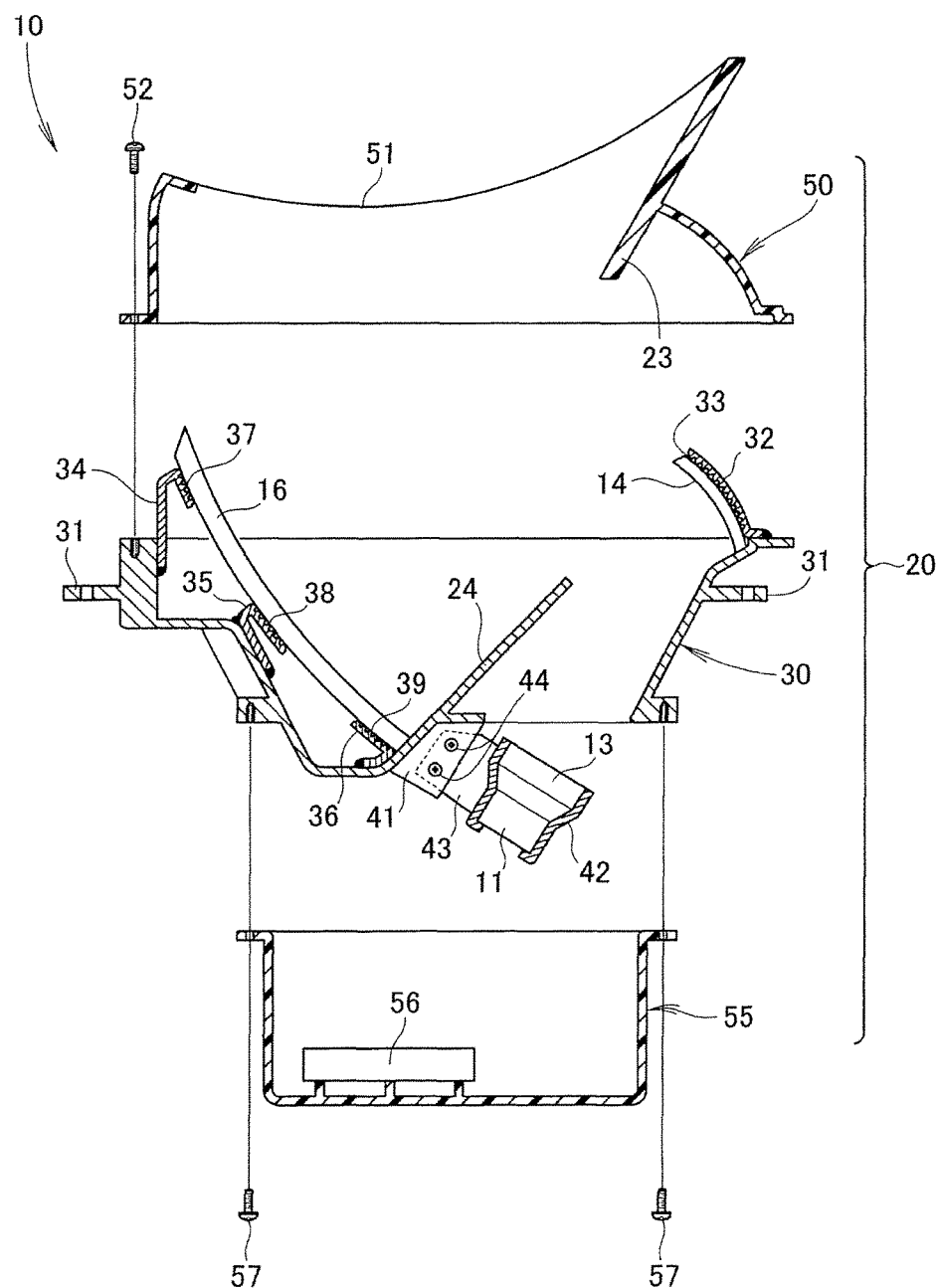
FIG. 3 is an exploded view of a head up display device according to a first embodiment of the present invention.

As shown in FIG. 3, in the head up display device 10, the case 20 includes a center frame 30 supporting the first and second concave mirrors 14, 16 and having a second shielding portion 24, an upper cover 50 attached to the upper side of the center frame 30 and having a first shielding portion 23, and a lower cover 55 attached to the lower side of the center frame 30.

The center frame 30 is an aluminum die-cast product having the mounting flanges 31, 31 on its outer periphery and the second shielding portion 24 extending obliquely upward in the interior.

For example, a stay 32 is welded to the center frame 30, and the first concave mirror 14 is fixed to the stay 32 with the adhesive layer 33. The second concave mirror 16 is fixed to the stays 34 to 36 welded to the inner surface of the center frame 30 with adhesive layers 37 to 39.

The stay 41 extends from the lower part of the center frame 30. Meanwhile, the light source 11 and the display unit 13 are fitted to the tubular bracket 42, and the bracket piece 43 extended from the tubular bracket 42 is fixed to the stay 41 with the screws 44, 44.

The center frame 30 has a much higher strength and rigidity than the resin molded product if it is an aluminum die-cast product. Since the first and second concave mirrors 14 and 16 and the display unit 13 are collectively attached to the center frame 30 rich in rigidity, these optical axis adjustments become difficult to deviate. Further, the center frame 30 rich in rigidity is attached to the vehicle by the mounting flanges 31, 31. When the cover is made of resin as a whole, the rigidity becomes insufficient and readjustment of the optical axis may be necessary. On the other hand, since the head up display device 10 of the embodiment is rich in rigidity, there is little concern.

The upper cover 50 is, for example, a polycarbonate molded product, and has a cover glass 51 on its upper surface, and integrally includes a first shielding portion 23 extending obliquely downward.

The lower cover 55 is a bottomed cylindrical body that opens upward, and is, for example, an ABS resin molded product, and incorporates a printed board 56 therein.

The lower cover 55 is attached to the center frame 30 from the bottom with screws 57, 57, and the upper cover 50 is attached with screws 52 from the top.

Figure 4:
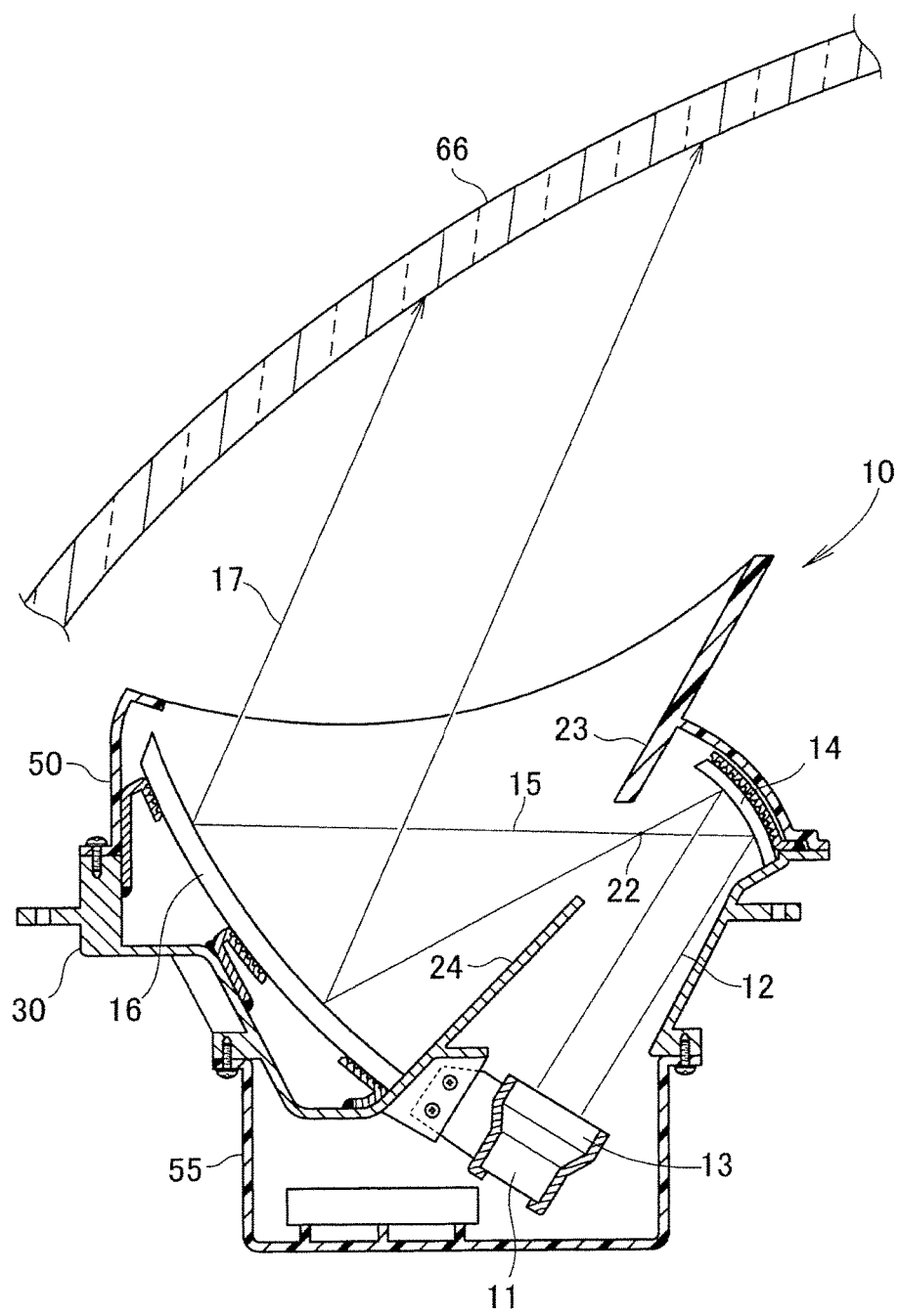
FIG. 4 is a cross-sectional view of a head up display device according to a first embodiment of the present invention.

The head up display device 10 shown in FIG. 4 is completed. The display light 12 emitted from the display unit 13 is reflected by the first concave mirror 14, and the display light 15 reflected by the first concave mirror 14 passes between the first and second shielding portions 23 and 24, and reaches the second concave mirror 16. The display light 17 reflected by the second concave mirror 16 rises and reaches the windshield 66 of the vehicle (the projection part 66 on which the reflected display light 17 is projected).

Figure 5:
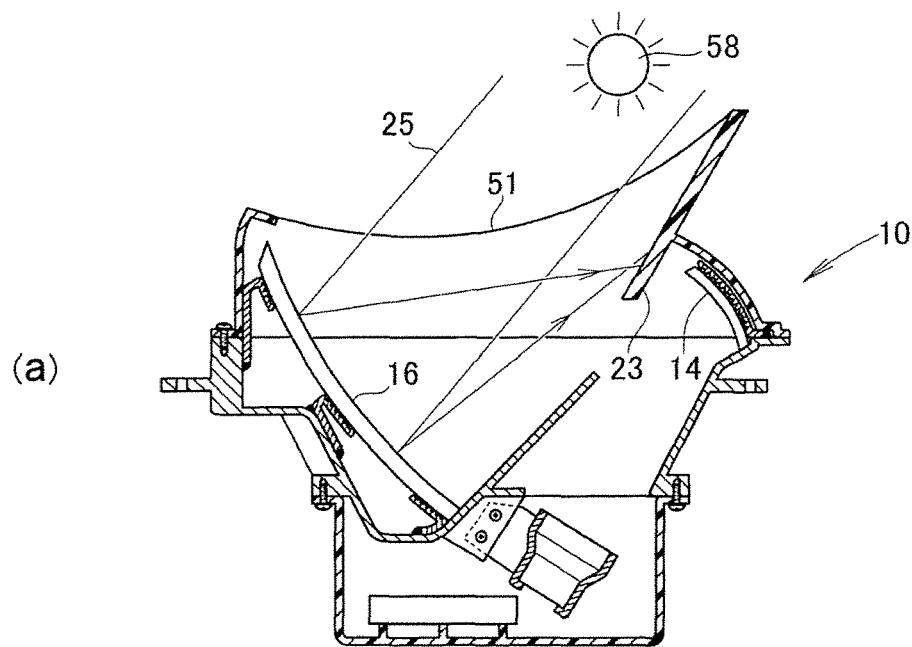
FIG. 5 is a view for explaining a shielding action of first and second shielding portions.
Figure 5:
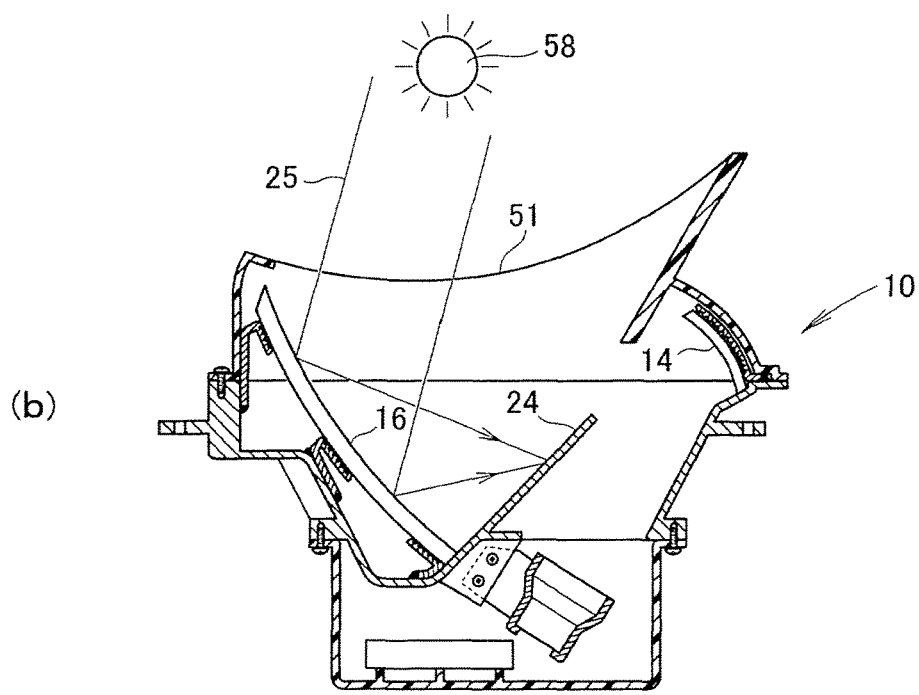

As shown in FIG. 5(a), when the altitude of the sun 58 is low, the external light 25 typified by sunlight passes through the cover glass 51, is reflected by the second concave mirror 16, and is shielded by the first shielding portion 23. Since the first shielding portion 23 is polycarbonate excellent in heat resistance, it has high strength against heat.

When the altitude of the sun 58 is high, as shown in FIG. 5(b), the external light 25 passes through the cover glass 51, is reflected by the second concave mirror 16, and is shielded by the second shielding portion 24. Since the second shielding portion 24 is aluminum excellent in heat resistance, the second shielding portion 24 has higher strength against heat.

Next, thermal conductivity will be discussed.

TABLE 2

|  | Heat resistant temperature | Thermal conductivity |
| --- | --- | --- |
| PC resin | (150° C.) | Approx. 0.2 W/m · k |
| ADC 12 | (580° C.) | Approx. 100 W/m · k |

( ) Heat resistance temperature (reference value)

Polycarbonate (PC) resin has thermal conductivity of about 0.2 W/m/K. On the other hand, the aluminum die-cast product (ADC 12) has a thermal conductivity of about 100 W/m/K.

Figure 6:
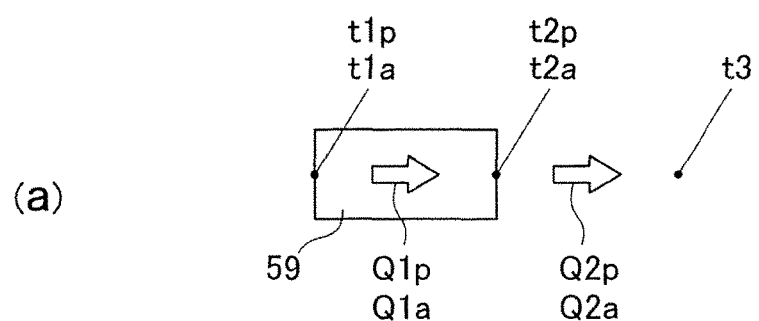
FIG. 6 is a diagram illustrating the flow of heat in the first and second shielding portions.
Figure 6:
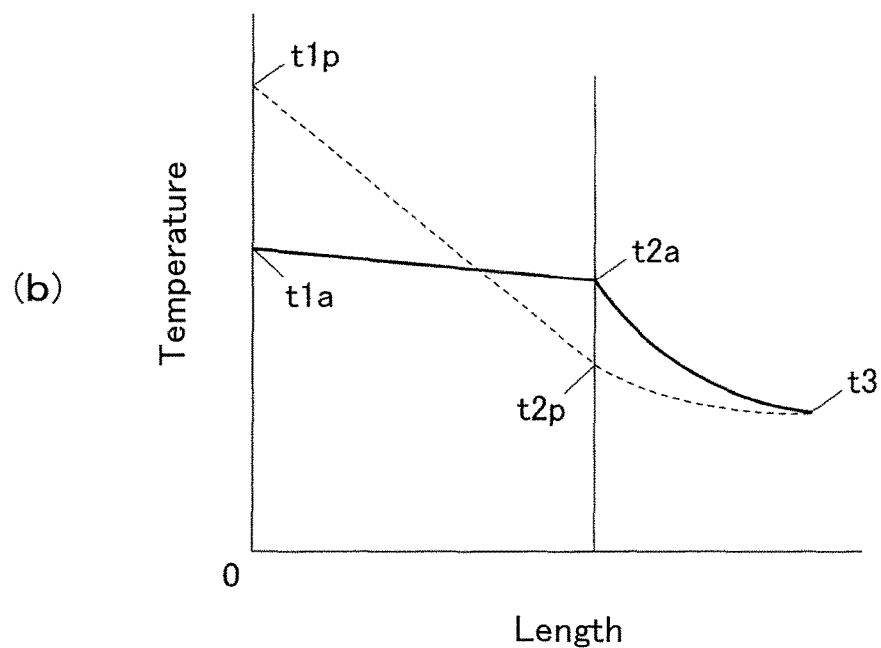

FIG. 6(a) is a diagram for explaining a very simple heat transfer model. It is assumed that one end of a rod 59 made of polycarbonate (PC) resin has a high temperature $t1p$, a temperature lower than $t1p$ at the other end ($t2p$ is higher than the atmospheric temperature $t3$), and in a thermally steady state. Assuming that the outer periphery of the rod 59 is thermally insulated, the heat $Q1p$ flowing inside the rod 59 and the heat $Q2p$ discharged from the other end of the rod 59 to the atmosphere are equal. Here, if the cross-sectional area of the rod is the unit cross-sectional area (1.0), $Q1p$ is calculated by the thermal conductivity $\lambda p \times$ the length of the bar$\times (t1p \times t2p)$. Further, $Q2p$ is calculated by the heat transfer coefficient $cp \times (t2p-t3)$.

It is assumed that one end of a rod 59 of an aluminum die-cast product (ADC 12) is assumed to be thermally steady at a high temperature $t1a$, a temperature lower than $t2a$ at the other end ($t2a$ is higher than the atmospheric temperature $t3$), and in a thermally steady state. Assuming that the outer periphery of the rod 59 is thermally insulated, the heat $Q1a$ flowing inside the rod 59 and the heat $Q2a$ discharged from the other end of the rod 59 to the atmosphere are equal. Here, if the cross-sectional area of the rod is the unit cross-sectional area (1.0), $Q1a$ is calculated by the thermal conductivity $\lambda a \times$ the length of the bar$\times (t1a-t2a)$. $Q2a$ is calculated by the heat transfer coefficient $ca \times (t2a-t3)$.

In the case of $Q1p=\lambda p \times$ the length of the bar$\times (t1p-t2p)$ and $Q1a=\lambda a \times$ the length of the bar$\times (t1a-t2a)$, $\lambda p$ is about 1/500 of $\lambda a$, much smaller than $\lambda a$. Although $Q1p<Q1a$, the ratio is expected to be much smaller than 1:500. Since $\lambda p$ is extremely small, $(t1p-t2p)$ becomes significantly larger as a tendency. On the other hand, since $\lambda a$ becomes extremely large, $(t1a-t2a)$ becomes much smaller as a tendency.

Further, $Q1p=Q2p$ and $Q1a=Q2a$, and $Q1p<Q1a$ to $Q2p<Q2a$. In the case of $Q2p=cp \times (t2p-t3)$ and $Q2a=ca \times (t2a-t3)$, $t3$ is common. Then, assuming that $cp$ is approximately equal to $ca$, $t2p<t2a$.

From the above, the temperature curve shown in FIG. 6(b) is obtained, and $t1p$ becomes significantly larger than $t1a$. As the thermal conductivity increases, the temperature of the first and second shielding portions 23, 24 can be quickly reduced. The lower the temperature, the less the thermal degradation.

From this finding, it is preferable that the first shielding portion 23 is also made of aluminum die-cast or light metal, which is the same as the second shielding portion 24.

Figure 7:
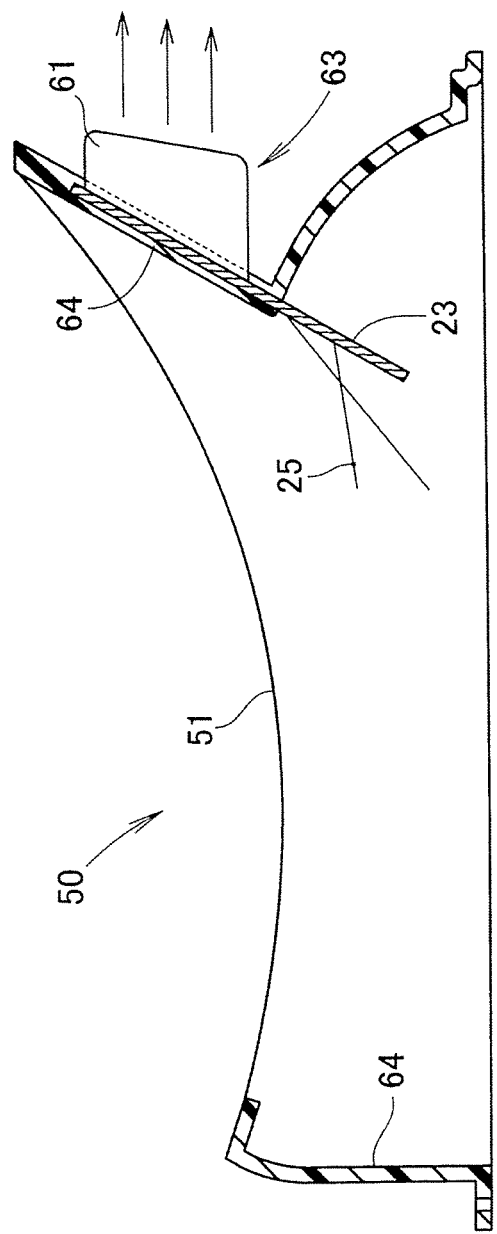
FIG. 7 is a view for explaining a modification example of a center frame.

As shown in FIG. 7, an aluminum die-cast product 63 integrally formed with the heat radiation fin 61 is preliminary manufactured in the first shielding portion 23, the aluminum die-cast product 63 is placed in a cavity of a molding die, and the PC resin 64 is injected into the cavity thereby performing so-called insert molding.

When the first shielding portion 23 is heated by the external light 25, heat propagates through the first shielding portion 23 and reaches the heat radiation fins 61. Since the heat radiation fin 61 has a large heat radiation area, it actively radiates heat towards the atmosphere.

It is to be noted that the whole of the upper cover 50 may be made of aluminum die-cast or light metal.

EXAMPLE 2

Figure 8:
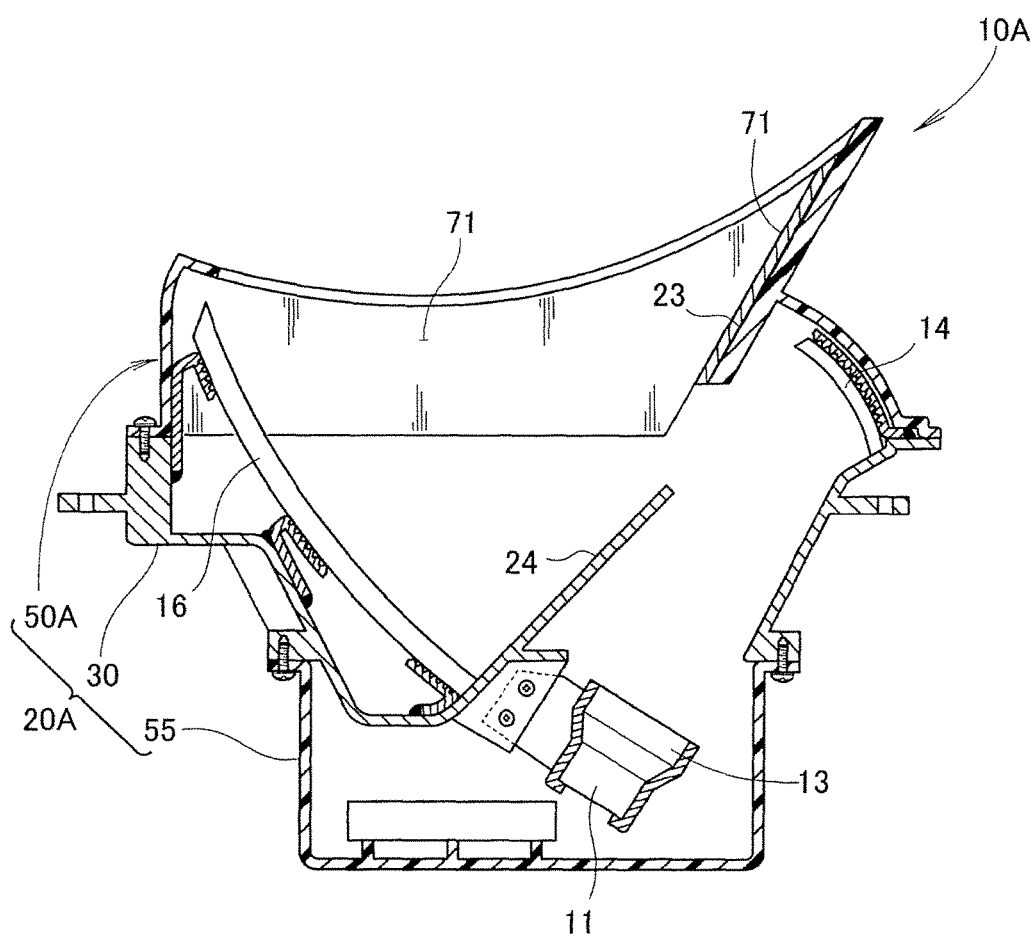
FIG. 8 is a cross-sectional view of a head up display device according to a second embodiment of the present invention.

Refer to FIG. 8. Next, a second embodiment of the present invention will be described with reference to the drawings. FIG. 8 shows a sectional configuration of the head up display device of the second embodiment. FIG. 8 corresponds to FIG. 4 above.

In the head up display device 10A according to the second embodiment, the metal plate 71 is disposed on the upper surface of the first shielding portion 23. The other basic configuration is common to the head up display device 10 (see FIG. 4) according to the first embodiment. For parts common to the first embodiment, reference numerals are used, and detailed description is omitted.

The upper cover 50A is a resin molded product, and for example, a mixed resin material of polycarbonate and polyethylene terephthalate (PET) can be used.

As the material of the metal plate 71, aluminum or an aluminum alloy can be used.

The resin as the material of the resin molded product is smaller than the density of the metal used for the metal plate 71. In addition, the heat resistant temperature of the resin used for the material is lower than the heat resistant temperature of the metal used for the metal plate 71. That is, the heat resistant temperature of the metal plate 71 is higher than the heat resistant temperature of the resin. As long as these conditions are satisfied, any material can be selected for resin or metal.

Figure 9:
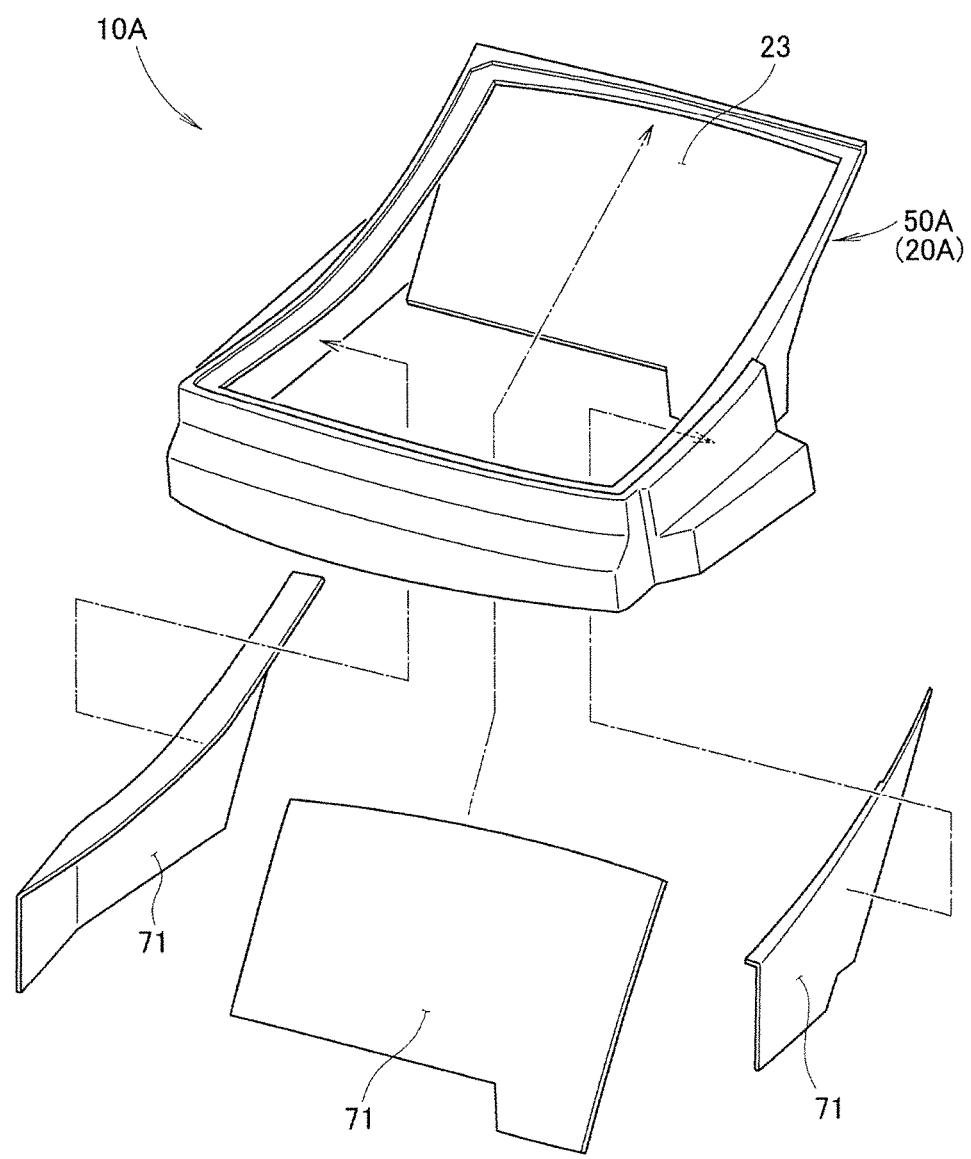
FIG. 9 is an exploded perspective view of an upper cover and a metal plate.

Refer to FIG. 9. Three metal plates 71 are attached to the upper cover 50A. The metal plates 71 are respectively attached to the upper surface of the first shielding portion 23, and the inner surfaces of the left and right side surfaces of the upper cover 50A extending forward from and the left and right end portions of the upper surface. These can be said to be design surfaces visible from the outside. That is, the metal plate 71 is arranged on the design surface. By placing the metal plate 71 on the visually recognizable part, it is possible to further improve the design.

The metal plate 71 can be disposed on the upper cover 50A by an arbitrary method such as sticking with a double-sided tape, adhesion with an adhesive, screwing using a screw, locking using a fixing hook, or the like.

The above can be summarized as follows. A metal plate 71 is disposed on the upper surface of the first shielding portion 23 that is a resin molded product. The first shielding portion 23 is a portion for blocking external light traveling into the case 20A. That is, the upper surface of the first shielding portion 23 is exposed to external light. As an example of external light striking the first shielding portion 23, sunlight can be mentioned. High heat resistance is required for the first shielding portion 23 against which sunlight impinges. On the other hand, it is desirable that the head up display device 10A as a whole be lightweight. The density of the resin used for the upper cover 50A is smaller (lower) than that of the metal plate 71. Therefore, by making the upper cover 50A a resin molded product, it is possible to reduce the weight of the head up display device 10A. On the other hand, the metal plate 71 has higher heat resistance temperature (heat resistance) than the resin used for the upper cover 50A. Therefore, by arranging the metal plate 71 on the upper surface of the first shielding portion 23 to which sunlight impinges, the heat resistance can be enhanced. That is, it is possible to increase the heat resistance of the first shielding portion 23 while reducing the weight of the head up display device 10A.

Figure 10:
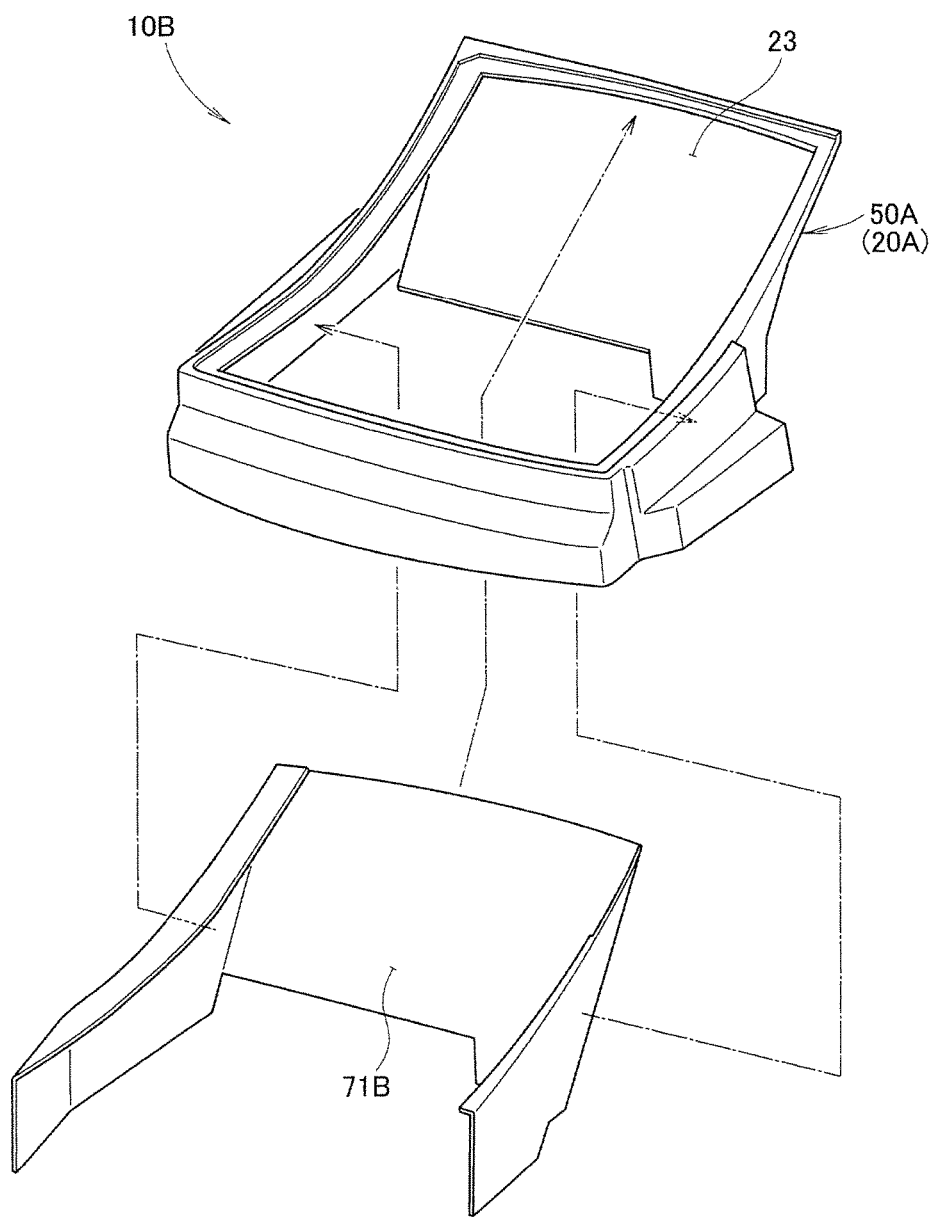
FIG. 10 is a view for explaining a modified example of a metal plate.

Refer to FIG. 10. FIG. 10 shows a modified example of the head up display device 10B in which the metal plate 71B is changed. That is, the metal plate 71B can also be constituted by a single plate. Even in this case, the predetermined effect of the present invention can be obtained. In addition, in the case of a single plate, there is no joint between the metal plates compared with the case where it is constituted by a plurality of plates, and the design can be further enhanced.

Although the head up display device of the present invention is suitable for passenger cars, it may be applied to general vehicles, ships and aircraft. That is, the present invention is not limited to the examples as long as the effects and advantages of the present invention are exhibited.

INDUSTRIAL APPLICABILITY

The head up display device of the present invention is suitable for a vehicle having a windshield.

DESCRIPTION OF REFERENCE NUMERALS 10, 10A, 10B Head up display device
11 Light source
12, 15 Display light
13 Display unit
14 First mirror (first concave mirror)
16 Second mirror (second concave mirror)
20, 20A Case
22 Cross point
23 First shielding portion
24 Second shielding portion
25 External light
26 General section
27 Anti-reflection treated film
30 Center frame
50, 50A Upper cover
55 Lower cover
71, 71B Metal plate

The invention claimed is:

1. A head up display device, comprising:
a display unit for emitting display light;
a first concave mirror for reflecting a first part and a second part of the display light emitted from the display unit;
a second concave mirror for reflecting the first part and the second part of the display light reflected by the first concave mirror; and
a case for housing the display unit and the first concave mirror and the second concave mirror, wherein,
the case includes a first shielding portion and a second shielding portion for blocking external light entering inside the case from outside of the case from proceeding toward the first concave mirror after the external light is reflected by the second concave mirror, the first concave mirror has a curvature that causes a first optical path of the reflected first part of the display light and a second optical path of the reflected second part of the display light to cross each other at a focal point before reaching the second concave mirror, and the first shielding portion and the second shielding portion extending towards each other and extending to a vicinity of the focal point allowing the first optical path and the second optical path to pass through between the first shielding portion and the second shielding portion after the first optical path and the second optical path cross each other.

2. The head up display device according to claim 1, wherein the first and second shielding portions are made of a material having a thermal conductivity higher than that of a general portion of the case.

3. The head up display device according to claim 1, wherein the first and second shielding portions are made of a material having a higher heat resistance than that of a general portion of the case.

4. The head up display device according to claim 1, wherein a portion of the first shielding portion comprises a anti-reflection treatment film for weakening or preventing reflection of the external light, the portion of the first shielding portion receiving the external light, and a portion of the second shielding portion comprises the anti-reflection treatment film, the portion of the second shielding portion receiving the external light.

5. The head up display device according to claim 1, wherein the case comprises:

a center frame supporting the first concave mirror and the second concave mirror and including the second shielding portion;

an upper cover attached to an upper side of the center frame and provided with the first shielding portion; and a lower cover attached to a lower side of the center frame.

6. The head up display device according to claim 5, wherein the center frame is a metal molded product,
the lower cover is a resin molded product, and
the upper cover is a resin molded product or a metal molded product.

7. The head up display device according to claim 6, wherein the metal molded product of the center frame is an aluminum die-cast product, and the metal molded product of the upper cover is an aluminum die-cast product.

8. The head up display device according to claim 1, wherein:

the case comprises:

a center frame supporting the first concave mirror and the second concave mirror and including the second shielding portion; and an upper cover attached to an upper side of the center frame and provided with the first shielding portion, the upper cover is a resin molded product, a metal plate is disposed at least on an upper surface of the first shielding portion, a density of a resin used for a material of the resin molded product is smaller than the density of the metal plate, and a heat resistance of the metal plate is higher than the heat resistance of the resin.

9. A head up display device, comprising:

a light source for emitting display light;
a first concave mirror for reflecting the display light;
a second concave mirror for reflecting the display light reflected by the first concave mirror; and
a case for housing the light source, the first concave mirror, and the second concave mirror, wherein the first concave mirror has a curvature for setting a focal point of the first concave mirror between the first concave mirror and the second concave mirror such that a distance between the first concave mirror and the second concave mirror is set to be greater than a distance between the focal point and the first concave mirror, wherein the case comprises a shielding portion for blocking external light entering inside the case from outside of the case from proceeding toward the first concave mirror after the external light is reflected by the second concave mirror, the shielding portion disposed between the first concave mirror and the second concave mirror, the shielding portion comprising an opening that passes the display light that reflected from the first concave mirror to the second concave mirror.

10. The head up display device according to claim 9, wherein the focal point of the first concave mirror is set before the display light that reflected from the first concave mirror passes through the opening of the shielding portion.

11. The head up display device according to claim 9, wherein a distance between the focal point and the second concave mirror is greater than the distance between the focal point and the first concave mirror.

* * * * *